(12) United States Patent
Yamamoto

(10) Patent No.: US 11,070,402 B2
(45) Date of Patent: Jul. 20, 2021

(54) RECEIVING APPARATUS AND RECEIVING METHOD

(71) Applicant: TOSHIBA MEMORY CORPORATION, Tokyo (JP)

(72) Inventor: Takaya Yamamoto, Kawasaki Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

(21) Appl. No.: 16/555,434

(22) Filed: Aug. 29, 2019

(65) Prior Publication Data
US 2020/0304350 A1 Sep. 24, 2020

(30) Foreign Application Priority Data
Mar. 19, 2019 (JP) .............................. JP2019-050640

(51) Int. Cl.
*H04L 25/03* (2006.01)

(52) U.S. Cl.
CPC .. *H04L 25/03057* (2013.01); *H04L 25/03853* (2013.01)

(58) Field of Classification Search
CPC ........ H04L 25/03057; H04L 25/03853; G01R 13/00; G01R 13/0272; G01R 13/34; G01R 13/342; G01R 13/345
See application file for complete search history.

(56) References Cited

U.S. PATENT DOCUMENTS

| | | | |
|---|---|---|---|
| 6,374,388 B1 * | 4/2002 | Hinch | H04L 7/042 714/799 |
| 8,860,477 B2 | 10/2014 | Hashida | |
| 9,401,189 B1 * | 7/2016 | Ding | G11C 29/022 |
| 2002/0196055 A1 * | 12/2002 | Jungerman | G01R 13/345 327/91 |
| 2004/0017366 A1 * | 1/2004 | Narita | G01R 13/0227 345/208 |
| 2006/0020412 A1 | 1/2006 | Bruensteiner | |
| 2007/0121714 A1 * | 5/2007 | Baker | G01R 13/0254 375/224 |
| 2007/0229055 A1 | 10/2007 | Nishida | |

(Continued)

OTHER PUBLICATIONS

Sandeep Krishnan, "A 10Gbps Eye Opening Monitor in 65nm CMOS", Published 2015 in 2015 IEEE International Symposium on Circuits and Systems (ISCAS), DOI:10.1109/ISCAS.2015.7169325, pp. 3028-3031.

*Primary Examiner* — David B Lugo
(74) *Attorney, Agent, or Firm* — Foley & Lardner LLP

(57) ABSTRACT

A receiving apparatus includes a first sample circuit configured to extract first binary data based on a first voltage and a clock timing of a received signal, a second sample circuit configured to extract second binary data based on an adjustable second voltage and a clock timing of the received signal, and a waveform processor configured to acquire a plurality of the second binary data from the second sample circuit using a pattern, the pattern corresponding to the first binary data extracted by the first sample circuit with consecutive sampling timings, determine an appearance frequency of the received signal based on the plurality of second binary data and the first binary data, and generate waveform information of the received signal according to the determined appearance frequency.

10 Claims, 5 Drawing Sheets

(56) References Cited

U.S. PATENT DOCUMENTS

| | | | | |
|---|---|---|---|---|
| 2016/0006589 A1* | 1/2016 | Kamali | ............ | H04L 25/03343 |
| | | | | 375/232 |
| 2018/0059156 A1* | 3/2018 | Zabolotov | .............. | H04B 17/29 |
| 2019/0227103 A1* | 7/2019 | Murakami | ......... | G01R 13/0254 |

* cited by examiner

| PATTERN | CDF CELL 1 | CDF CELL 2 | CDF CELL 3 |
|---|---|---|---|
| 000 | C10 | C20 | C30 |
| 001 | C11 | C21 | C31 |
| 010 | C12 | C22 | C32 |
| 011 | C13 | C23 | C33 |
| 100 | C14 | C24 | C34 |
| 101 | C15 | C25 | C35 |
| 110 | C16 | C26 | C36 |
| 111 | C17 | C27 | C37 |

| PATTERN | PDF CELL 1 - CELL 2 | PDF CELL 2 - CELL 3 |
|---|---|---|
| 000 | P10=C10-C20 | P20=C20-C30 |
| 001 | P11=C11-C21 | P21=C21-C31 |
| 010 | P12=C12-C22 | P22=C22-C32 |
| 011 | P13=C13-C23 | P23=C23-C33 |
| 100 | P14=C14-C24 | P24=C24-C34 |
| 101 | P15=C15-C25 | P25=C25-C35 |
| 110 | P16=C16-C26 | P26=C26-C36 |
| 111 | P17=C17-C27 | P27=C27-C37 |
| Total | Sum(P1*) | Sum(P2*) | n=300 n=50 n=20

US 11,070,402 B2

RECEIVING APPARATUS AND RECEIVING METHOD

CROSS-REFERENCE TO RELATED APPLICATION

This application is based upon and claims the benefit of priority from Japanese Patent Application No. 2019-050640, filed Mar. 19, 2019, the entire contents of which are incorporated herein by reference.

FIELD

Embodiments described herein relate generally to a receiving apparatus and a receiving method.

BACKGROUND

Serial interface standards such as PCI Express (registered trademark) standard (hereinafter referred to as PCIe (registered trademark)) provide a specification called lane margining (hereinafter referred to as "LM") for monitoring an eye pattern of a received signal. To satisfy the specification, in an apparatus receiving a signal, a sample circuit for LM is obviously required in parallel with respect to a data sample circuit obtaining digital data from the received signal. The sample circuit for LM has a configuration capable of adjusting a reference voltage which is a threshold voltage with respect to the eye pattern and offset values of time. The eye pattern is acquired by comparing a determination result of the sample circuit for LM with a determination result without offset by the data sample circuit.

On the other hand, there is a demand for monitoring a signal waveform in a wider range other than an opening of the eye pattern apart from the eye pattern of the received signal, to check for a situation of jitter due to inter-symbol interference (ISI) or the like.

In order to monitor the signal waveform, a method may be considered where another sample circuit having a different reference voltage in addition to the sample circuit for LM, is provided in parallel at a stage subsequent to an equalizer at an input end of the received circuit. The method is not preferable because of increasing a load on an input end of the data sample circuit due to an increase of a parasitic capacitance or the like, which may cause deterioration of waveform quality.

DETAILED DESCRIPTION

Embodiments provide a receiving apparatus and a receiving method capable of performing waveform monitoring clearly even for an input signal whose periodicity is not stable.

In general, according to one embodiment, a receiving apparatus of one embodiment includes a first sample circuit configured to extract first binary data based on a first voltage and a clock timing of a received signal, a second sample circuit configured to extract second binary data based on an adjustable second voltage and a clock timing of the received signal, and a waveform processor configured to acquire a plurality of the second binary data from the second sample circuit using a pattern, the pattern corresponding to the first binary data extracted by the first sample circuit with consecutive sampling timings, determine an appearance frequency of the received signal based on the plurality of second binary data and the first binary data, and generate waveform information of the received signal according to the determined appearance frequency.

Figure 1:
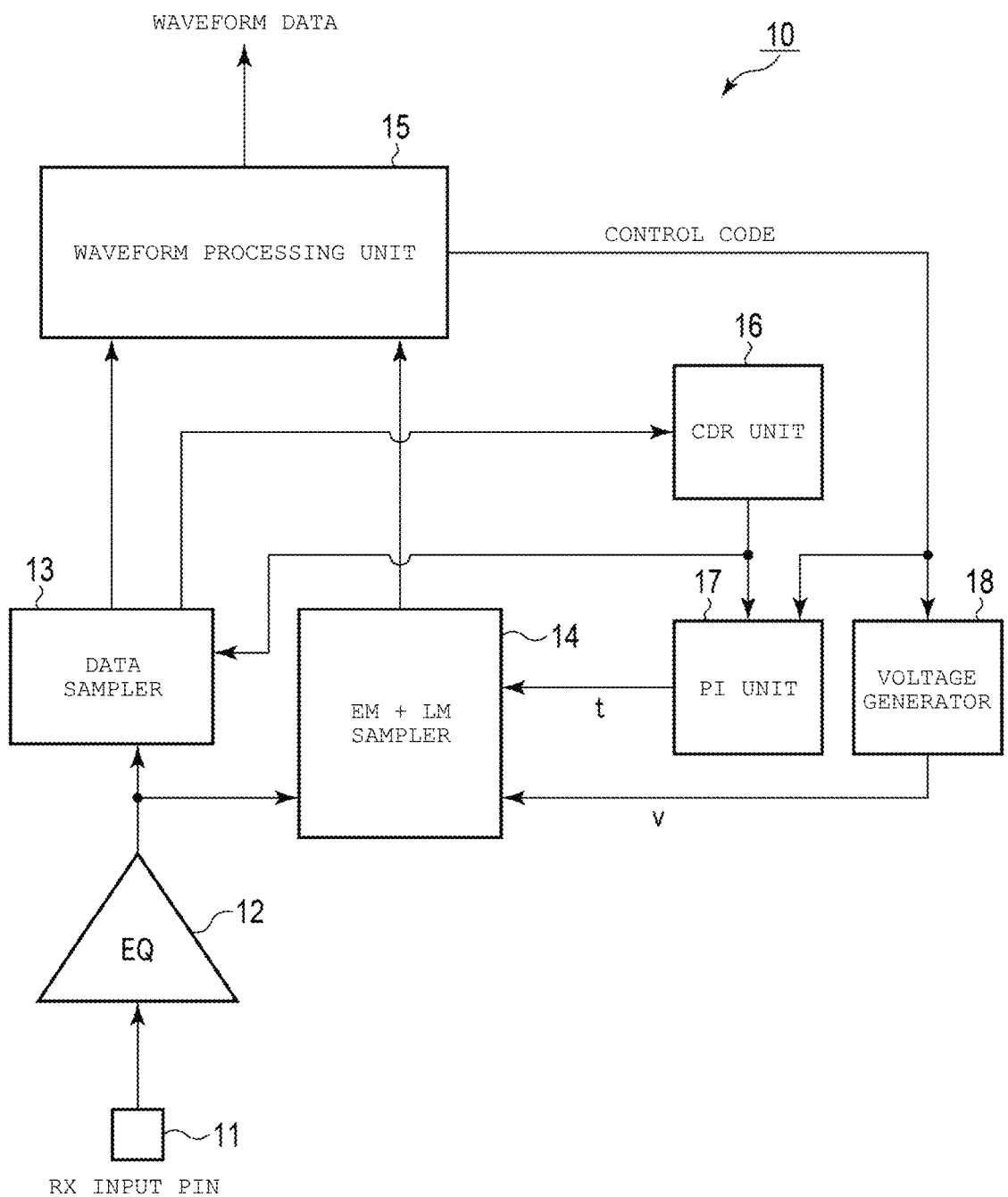
FIG. 1 is a block diagram showing a portion of a circuit configuration of a receiving apparatus according to one embodiment.

Hereinafter, one embodiment will be described with reference to the drawings. FIG. 1 is a block diagram showing a portion of a circuit configuration of a receiving apparatus 10 according to one embodiment, provided at an input unit of a storage system in a personal computer. The storage system includes, for example, a solid state drive (SSD) and a memory card.

In FIG. 1, a received signal from a south bridge of the personal computer is input to an RX input pin 11. The received signal is differentially operated between two lines in a physical layer of a serial interface of PCIe standard, for example.

The received signal inputted is subjected to particular compensation such as amplification of a high frequency component by an equalizer (EQ) 12, and then is sent to a data sampler (data sample circuit) 13 and an eye monitoring (EM) and lane margining (LM) sampler (waveform sample circuit) 14.

The data sampler 13, in synchronization with a clock signal from a clock data recovery (CDR) unit 16, extracts (samples) received data (binary data "1" and "0") from the received signal to output the data to a waveform processing unit 15, and outputs the data on which clock information is embedded to the CDR unit 16. It should be appreciated that the waveform processing unit 15 and other components according to the present embodiment may be implemented by hardware or software. As for hardware, as appropriate, it may be a circuit (e.g., circuitry of a CPU, GPU, FPGA, ASIC, or other processing circuits implemented using electronic circuits), or a processor (e.g., CPU, MPU, GPU, DSP, and the like) with a memory configured to implement the identified component herein.

The CDR unit 16 separates a clock based on the clock information from the received data and outputs the separated clock to the data sampler 13 and a phase interpolator (PI) unit 17.

The PI unit 17, based on the clock from the CDR unit 16, supplies a clock timing signal "t" to an EM+LM sampler 14, where the clock timing signal "t" is subjected to timing adjustment according to a control code signal indicating a control operation via a code and being supplied from the waveform processing unit 15.

The control code signal from the waveform processing unit 15 is also sent to a voltage generator 18.

The voltage generator 18 outputs a reference voltage "v" adjusted according to the control code signal supplied from the waveform processing unit 15 to the EM+LM sampler 14 based on a reference voltage used in the data sampler 13.

The EM+LM sampler 14 is a sample circuit provided in parallel with the data sampler 13 in order to extract (sample) a signal waveform including an opening of an eye pattern in the received signal. The EM+LM sampler 14, with respect to the received signal to be inputted through the equalizer 12, is in synchronization with the clock timing signal "t" from the PI unit 17, extracts the received data (binary data "1" and "0") using the reference voltage "v" from the voltage generator 18, and outputs the received data to the waveform processing unit 15.

The waveform processing unit 15 digitally processes the data output from the data sampler 13 and the data output from the EM+LM sampler 14 and generates waveform data of the entire signal including the eye pattern opening of the input signal from the processing result.

The generated waveform data, if necessary, for example, may be displayed on a display on the personal computer using software for inspection or may be displayed by another inspection device externally connected to the personal computer.

Figures 2A, 2B, 2C:
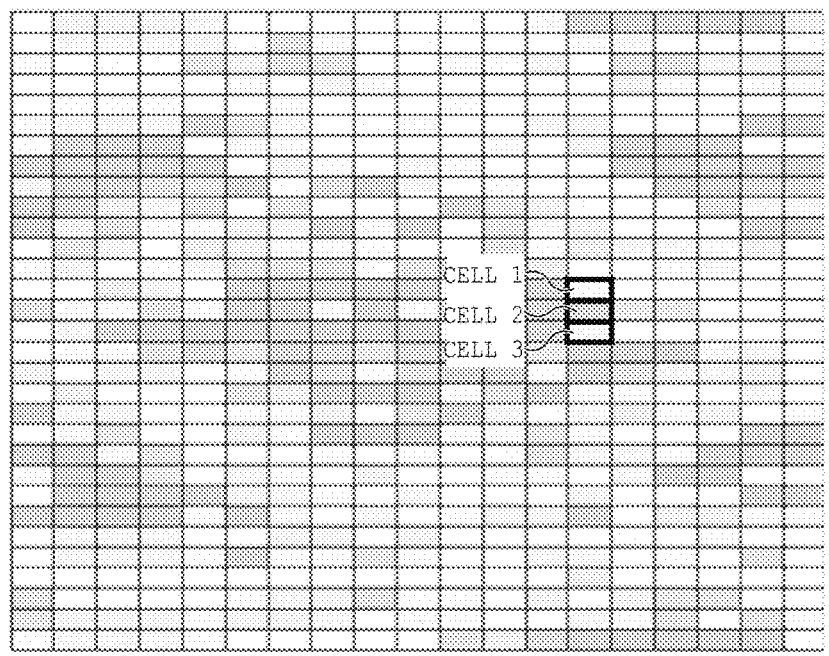
FIGS. 2A, 2B, and 2C are diagrams conceptually showing processing performed by a waveform processing unit according to one embodiment.

Next, operation of the embodiment will be described. FIGS. 2A, 2B, and 2C are diagrams showing a basic concept of processing performed by the waveform processing unit 15.

In FIG. 2A, a large number of sample waveforms of an actual signal are superimposed and illustrated on a coordinate plane in which a vertical axis represents a voltage and a horizontal axis represents time. In the figure, a rectangular minimum division region corresponding to a resolution is referred to as a cell which is a minimum unit constituting an image of the signal waveform, and the signal waveform is represented by lightness and darkness of each cell according to a frequency of a signal appearance. In the present embodiment, a cell with a high frequency of the signal appearance is represented in a darker color and a cell with a high frequency of a signal absence is represented in a lighter color, during a sampling period in which sampling is performed a plurality of times at the same cell position.

In FIG. 2A, in order to explain "cell 1" to "cell 3" described later, "pale" representation is shown where an entire density is intentionally reduced.

In the present embodiment, pattern filters of 3-bit (eight types) bit patterns "000" to "111" are used for the data obtained by the data sampler 13 and the EM+LM sampler 14 in each sampling, and as shown in the figure, presence or absence (1 and 0) of the signal is compared and determined for each cell. By moving positions of the cell 1 to cell 3 sequentially in the voltage direction and time direction while scanning an entire sample range which may be taken by the signal waveform, and repeating the same comparison and determination processing, an appearance frequency as a result of digital processing is calculated by statistical processing based on a determination result.

FIG. 2B shows an example where the appearance frequency obtained from the determination result of the cell 1 to cell 3 for each of the 3-bit bit patterns "000" to "111", is set as variables C10, C20, C30, C11, C21, C31, . . . , C17, C27, and C37 of a cumulative distribution function CDF.

As shown in FIG. 2C, for each of the 3-bit bit patterns "000" to "111", it is possible to obtain algebra P10, P20, P11, P21, . . . , P17, and P27 of a probability density function PDF via differentiation by subtraction of the cumulative distribution function CDF between the cells adjacent in the voltage direction. By statistically processing the algebra, it is possible to reduce non-uniformity of inter-symbol interference among the cells.

In FIG. 2A, a case is described where the cell with the high frequency of the signal appearance is represented in the darker color and the cell with the high frequency of the signal absence is represented in the lighter color, during the sampling period at the same cell position. The present disclosure is not limited thereto, and it is also possible to choose a representation where each cell is displayed in color by appropriately combining hue, saturation, and lightness according to the frequency of the signal appearance.

Figure 3:
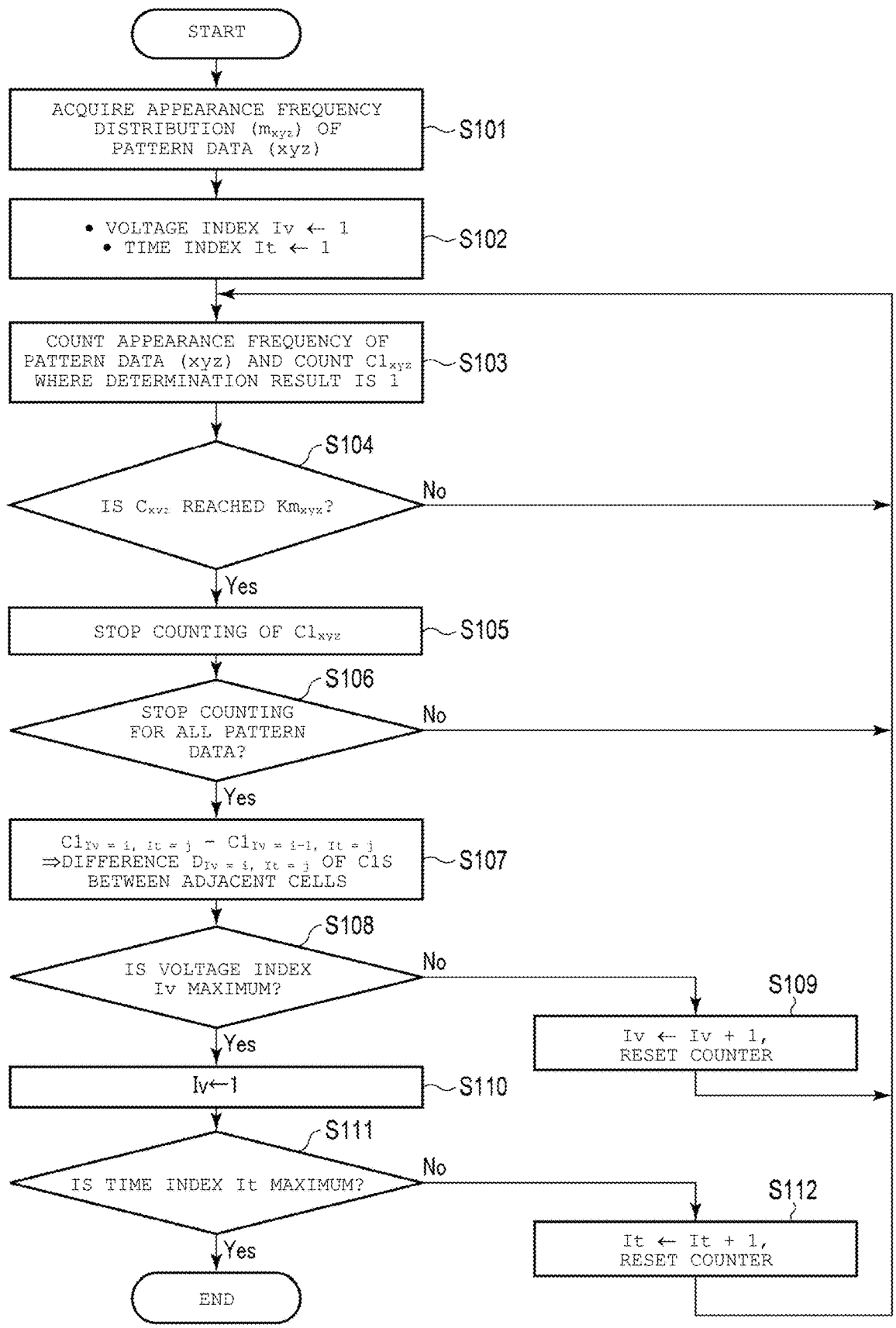
FIG. 3 is a flowchart showing specific processing of waveform data generation performed by the waveform processing unit according to one embodiment.

FIG. 3 is a flowchart showing processing content of specific waveform data generation performed by the waveform processing unit 15. The waveform processing unit 15 acquires output of the data sampler 13 and the EM+LM sampler 14 for n consecutive samplings and performs the following processing on the acquired result.

First, the waveform processing unit 15 acquires an appearance frequency set $m_{xyz}$ of 3-bit pattern data (x, y, z: 0 or 1, respectively), where the current data by the first sampler is y, the previous data is x, and the following data is z, with respect to a result of a first m times (m<n) in n times of the sampling (S101).

More specifically, the waveform processing unit 15 acquires the appearance frequency of the pattern data "000" as $m_{000}$, the appearance frequency of the pattern data "001" as $m_{001}$, . . . , and the appearance frequency of the pattern data "111" as mill. The appearance frequency set $m_{xyz}$ is a set of the appearance frequencies $m_{000}$ to $m_{111}$.

The number of sampling times m for acquiring the appearance frequency distribution $m_{xyz}$ is set to a value which is obviously smaller than the number of sampling times n for acquiring the entire signal waveform data, and is set in advance as, for example, m=n/10.

By setting the number of sampling times for acquiring the appearance frequency set, sufficiently smaller than the number of sampling times for acquiring the entire signal waveform data, it is possible to reduce a load at the waveform processing unit 15 for processing to grasp a tendency of the entire received signal and to perform display of the signal waveform in a shorter time.

Next, the waveform processing unit 15 sets an initial value "1" indicating a minimum value in each waveform range, to an index Iv in the voltage direction and an index It in the time direction in the waveform display ranges of the sampling result (S102).

The waveform processing unit 15 performs comparison and determination using the pattern data (xyz) which exists for each of the received signals during the sampling period and m times at a cell position based on the voltage index Iv and the time index It at a time point above (Iv=1, It=1 at the time point). That is, the waveform processing unit 15 counts the appearance frequency $C_{xyz}$ of the pattern data (xyz) and an occurrence count $C1_{xyz}$ where a comparison result of the second sample circuit is 1 (that is, a voltage of the input signal is determined to be higher than a voltage level indicated by Iv), and the previous, current and following results of the first sample circuit is x, y and z. (S103).

The waveform processing unit 15 determines whether or not the appearance frequency $C_{xyz}$ reached an upper limit number $Km_{xyz}$, which is a constant K times the appearance frequency $m_{xyz}$ acquired in S101, with respect to the pattern data xyz which is in the middle of counting processing (S104).

When it is determined that the appearance frequency $C_{xyz}$ did not reach the upper limit number $Km_{xyz}$ (No in S104), the waveform processing unit 15 returns to processing S103 and continues counting processing of the occurrence count $C1_{xyz}$ where the determination result is 1.

When it is determined in S104 that the appearance frequency $C_{xyz}$ reached the upper limit number $Km_{xyz}$ (Yes in S104), the waveform processing unit 15 stops counting of the occurrence count $C1_{xyz}$ where the determination result is (S105).

Next, the waveform processing unit 15 determines whether or not counting of the occurrence count $C1_{xyz}$ where the determination result is 1 stops for all pattern data (S106).

When it is determined that the counting of the occurrence count $C1_{xyz}$ where the determination result is 1 for all pattern data is not stopped, that is, the counting for any pattern data is continuing (No in S106), the waveform processing unit 15 continues the counting processing from S103 again.

The waveform processing unit 15 repeatedly performs the processing of S103 to S106 while sequentially updating the pattern data (xyz). That is, the waveform processing unit 15 continues the counting of the occurrence count $C1_{xyz}$ where the determination result is 1 until the appearance frequency $C_{xyz}$ at the same cell position reaches the upper limit number $Km_{xyz}$ for all pattern data (xyz).

If it is determined in S106 that the counting of the occurrence count C1xyz where the determination result is 1 stopped for all pattern data (Yes in S106), the waveform processing unit 15 performs calculation of a count result on an assumption that processing is finished at the cell position based on the voltage index Iv and the time index It at the time point. More specifically, the waveform processing unit 15 subtracts the occurrence count $C1_{Iv=i-1,\ It=j}$, where the determination result is 1, acquired at the 1-preceding cell position at the time point from the occurrence count $C1_{Iv=i,\ It=j}$, where the determination result is 1, acquired at the cell position at the time point, and calculates a difference $D_{Iv=i,\ It=j}$ of the occurrence counts C1 where the determination result is 1 between adjacent cells for all data patterns (S107).

When the voltage index Iv is 1 at the time point, the occurrence count $C1_{Iv=i-1,\ It=j}$, where the determination result is 1, acquired at the 1-preceding cell position does not exist, so the waveform processing unit 15 omits processing of S107.

Thereafter, the waveform processing unit 15 determines whether or not the current voltage index Iv is a maximum value in the waveform display range of the sampling result of the signal waveform (S108). That is, after the processing of S103 to S106 which was repeatedly performed at the time index It of the time point is finished, it is determined whether or not the voltage index Iv needs to be updated.

When it is determined that the current voltage index Iv is not yet the maximum value (No in S108), the waveform processing unit 15 updates and sets the value of the voltage index Iv by "+1", resets a count value of the occurrence count $C1_{xyz}$ where the determination result is 1 (S109), and starts the counting processing from S103 again.

The waveform processing unit 15 repeatedly performs the processing of S103 to S109 while sequentially updating the voltage index Iv by "+1". That is, the waveform processing unit 15 calculates the difference $D_{Iv=i,\ It=j}$ of the occurrence counts C1 where the determination result is 1 between the adjacent cells for all pattern data.

In S108, when it is determined that the current voltage index Iv is the maximum value (Yes in S108), since in this case, the waveform processing unit 15 generally finished a series of processing at the time index It of the time point, the waveform processing unit 15 prepares for processing at the next time index It and sets the initial value "1" indicating the minimum value in the waveform display range of the sampling result of the signal waveform, to the voltage index Iv (S110).

Next, the waveform processing unit 15 determines whether or not the time index It at the time point is the maximum value in the sampling range of the signal waveform (S111). That is, it is determined whether or not processing of the entire waveform display range of the sampling result of the signal waveform indicated by the voltage index Iv and the time index It is finished after the processing of S103 to S109 which was repeatedly performed is finished.

When it is determined that the time index It is not the maximum value and the processing is not finished (No in S111), the waveform processing unit 15 updates and sets the value of the time index It by +1, resets the occurrence count C1 xyz where the determination result is 1 (S112), and starts the counting processing from S103 again.

The waveform processing unit 15 repeatedly performs the processing of S103 to S112 while sequentially setting the time index It by "+1". That is, the waveform processing unit 15 calculates the difference $D_{Iv=i,\ It=j}$ between the occurrence counts C1 where the determination result is 1 between the adjacent cells for all pattern data so as to correspond to each voltage index Iv at each time index It.

When it is determined in S111 that the time index It is the maximum value (Yes in S111), the waveform processing unit 15 determines that the processing of the entire waveform display range of the sampling result of the signal waveform indicated by the voltage index Iv and the time index It is finished, and finishes the processing of FIG. 3.

The waveform processing unit 15 uses the calculation result regarding the difference $D_{Iv=i,\ It=j}$ of the occurrence counts C1 where the determination result is 1 between adjacent cells at each cell position in the entire waveform display range and calculates values corresponding to Sum (P1*) and Sum (P2*) shown in FIG. 2C. That is, the waveform processing unit 15 may calculate the signal waveform data to be absolutely continuous by performing the statistical processing to reduce non-uniformity of the inter-symbol interference based on the probability density function PDF determined by external factors. That is, environment and other blocks which include EQ in RX, channel between RX and TX, and EQ in TX.

Figure 4A:
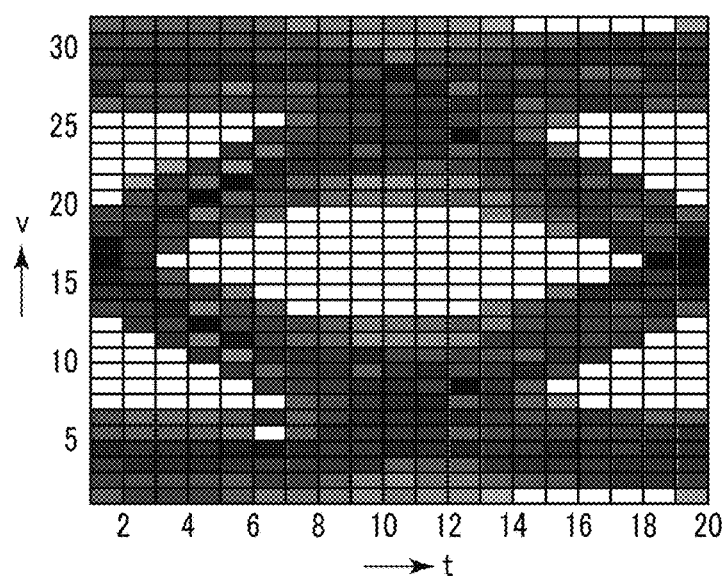
FIGS. 4A, 4B, and 4C are diagrams showing results of acquiring signal waveform data for a continuous display cycle of a plurality of n frames according to one embodiment.
Figure 4B:
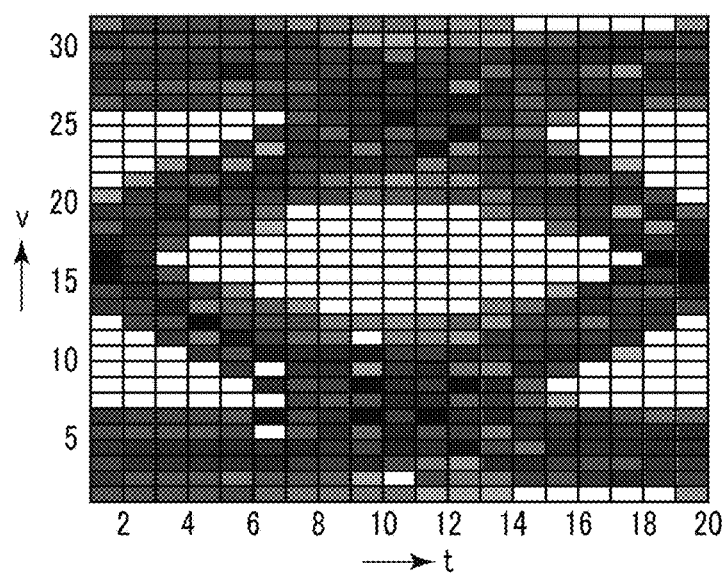
Figure 4C:
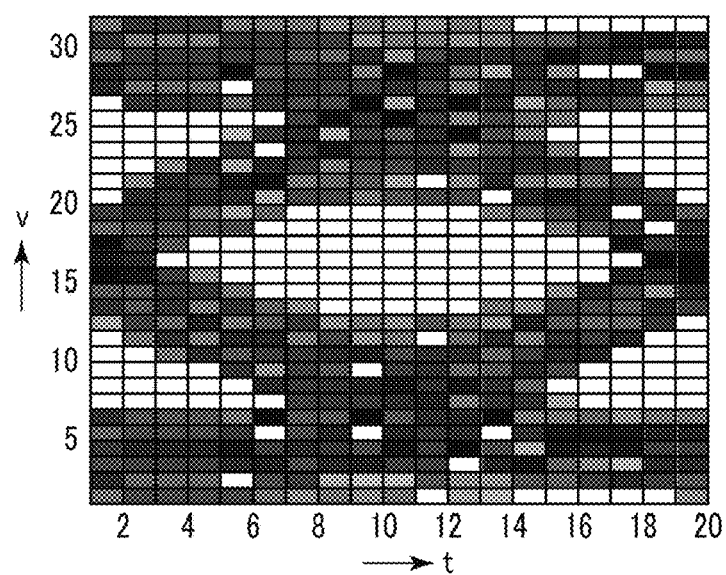

FIGS. 4A, 4B, and 4C show results of acquiring the signal waveform data by n times of sampling using a 3-bit, 8-pattern pattern filter. Each figure is an example in which a resolution (number of cells) of the index It in the time direction is 20 and a resolution (number of cells) of the index Iv in the voltage direction is 32, and the number of processing data is 8×n×20×32.

Examples of each signal waveform data are shown in FIG. 4A when n=300, FIG. 4B when n=50, and FIG. 4C when n=20. In these figures, the vertical axis indicates a voltage (v) and the horizontal axis indicates a time (t), and signal waveforms acquired by sampling n times are superimposed and shown.

In FIGS. 4A to 4C, in each cell which is the minimum divided region, the signal waveform is represented by light and shade according to the frequency at which the signal appears. In the present embodiment, the cell with the high frequency of the signal appearance is represented in a darker color and the cell with the high frequency of the signal absence is represented in a lighter color, by sampling n times at the same cell position.

As shown in FIGS. 4 (A) to 4 (C), as an overall tendency, in the entire signal waveform including the opening of the eye pattern, the larger the number of sampling times n, the clearer the distribution between the cell where a relatively large number of the signals are measured (i.e., high density and darker) and the cell where the signal is not measured much (i.e., low density and whiter). This indicates that high dense region where a relatively large number of the signals are measured around has smaller number of low dense cells as the number of sampling time n is larger However, if an attention is paid to the cell in which a relatively large number of signals are measured and how the cells are connected, where the cell is shown particularly as black or gray close to black in the figure, has the high frequency of the appearance of the signal, and has an expectation that the signal almost certainly appears, it was possible to confirm that the waveform of the entire signal including the eye pattern opening can be almost clearly drawn and displayed as shown in FIG. 4C even in the signal waveform data with the sampling number n=20 where the acquisition period of the signal waveform is the shortest.

When an occurrence frequency of digital data "1" and "0" in the received signal is largely biased to either one, data of a signal waveform having a shape different from the shape of the waveform to be originally obtained may be generated when processing such as waveform data generation is performed on a premise that the occurrence frequency of "1" or "0" is substantially equal. Therefore, in the present embodiment, when a frequency where a result of comparison and determination with continuous 3-bit pattern data is 1 is counted, an upper limit value is set based on the appearance frequency of the same pattern data acquired at the initial stage of processing, and when the count value reaches the upper limit value, the counting operation is stopped.

Figure 5A:
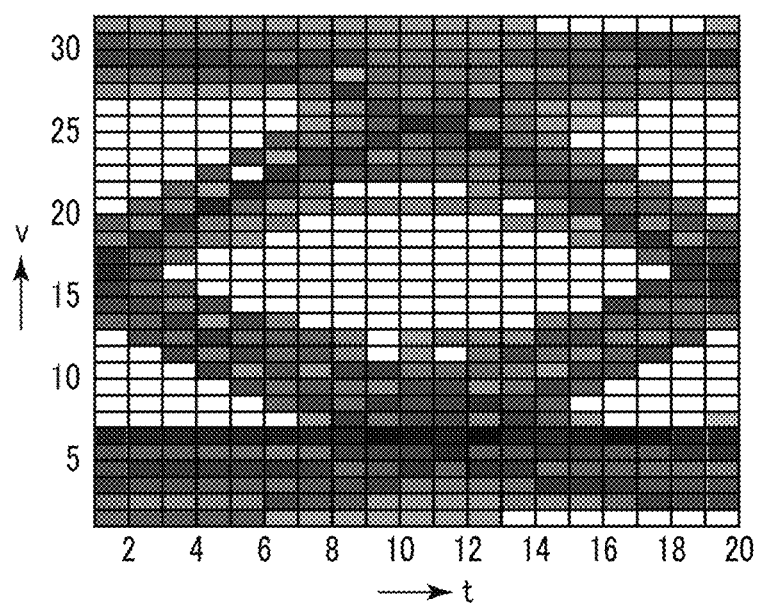
FIGS. 5A and 5B are diagrams showing generation results of waveform data according to one embodiment.
Figure 5B:
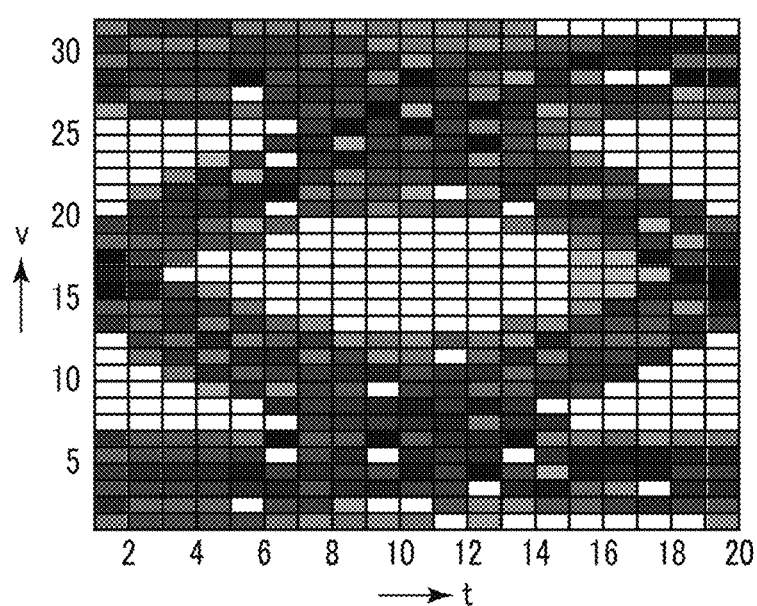

FIGS. 5A and 5B are diagrams showing generation results of the waveform data for showing an effect of the present embodiment. FIG. 5A illustrates a signal waveform when more digital data "0" is included in the received signal. FIG. 5A indicates that a region lower than the opening of the eye pattern in the signal waveform, particularly in the vicinity of v=6 in the voltage direction, is the clearer signal waveform even if it is compared to a region above the opening of the eye pattern, particularly the signal waveform in the vicinity of v=26 to 29.

It is due to the fact that after acquiring the appearance frequency distribution of each pattern data for m times which is a part of the received signal actually acquired for the number of sampling times n (S101), when processing is performed in order to display the entire waveform of the received signal for n times and the frequency where the result of the comparison and determination with each pattern data is 1 is counted, counting more than the upper limit value is stopped when the upper limit value based on the appearance frequency of the same pattern data is reached (S104, S105).

On the other hand, on an assumption that processing of setting the upper limit value to the counting operation for the result number of the comparison and determination with each pattern data according to the present embodiment as described above is not performed, and an appearance frequency of a bit pattern in the received signal is approximately equal, when the received signal acquired is compared and determined with each pattern data, the signal waveform data finally obtained from the received signal similar to FIG. 5A is one shown in FIG. 5B.

In this case, as shown in FIG. 5A, the light and shade of the cell portion showing the waveform should be different at upper and lower sides sandwiching the opening of the eye pattern of the signal waveform, but a dark waveform is also displayed above the opening of the eye pattern, which indicates a possibility that display of the correct signal waveform corresponding to the received signal may not be obtained.

As described above in detail, according to the present embodiment, while minimizing an increase in a load applied to the input signal to the data sampler 13, it is possible to remove the inter-symbol interference between the cells even in an input signal whose periodicity is not stable and to display a clear waveform.

In the embodiment, a configuration was provided such that the waveform data is generated by performing post-processing using probability distribution for each data pattern of continuous X bits, for example, 3 bits, for each cell of the waveform display range. As a result, a load of statistical operation which waveform processing unit 15 performs can be kept low.

Further, in the present embodiment, a configuration was provided such that it is prepared for the case where the appearance frequency of the bit pattern in the received signal is significantly biased to one side, the appearance frequency of the pattern data is calculated from the part of the received signal, and the upper limit is set when the result of the comparison and determination with the pattern data is counted. As a result, even when the appearance frequency of the bit pattern of the digital data "1" and "0" extracted from the received signal is biased, it is possible to display the correct signal waveform corresponding to the received signal.

While the present embodiment has shown the case of processing the received signal which differentially operates between two lines in the physical layer of the serial interface of the PCIe (registered trademark) standard, the present embodiment is not limited thereto, and it is possible to apply the present embodiment even to a single operation in a similar manner.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A receiving apparatus comprising:
   a first sample circuit configured to extract first binary data based on a first voltage and a clock timing of a received signal;
   a second sample circuit configured to extract second binary data based on an adjustable second voltage and an adjustable clock timing of the received signal; and
   a waveform processor configured to:
   acquire a plurality of the second binary data from the second sample circuit using a pattern, wherein the pattern includes a plurality of bits indicating presence or absence of the first binary data extracted at a plurality of sampling timings, respectively;
   determine an appearance frequency of the received signal based on the plurality of second binary data and the first binary data; and
   generate waveform information of the received signal according to the determined appearance frequency.

2. The receiving apparatus according to claim 1, wherein the waveform processor is further configured to statistically process the second binary data by sampling the received signal a plurality of times using the pattern to generate the waveform information.

3. The receiving apparatus according to claim 2, wherein the waveform processor is further configured to repeatedly acquire the second binary data and perform the statistical processing up to an upper limit determined according to an appearance frequency of each of a plurality of patterns.

4. The receiving apparatus according to claim 3, wherein the appearance frequency of each of the plurality of patterns is determined based on the first binary data and a part of the second binary data.

5. The receiving apparatus according to claim 1, wherein the waveform processor is further configured to generate the waveform information using at least one of hue, saturation, or lightness according to the appearance frequency.

6. A receiving method comprising:
   extracting first binary data based on a first voltage and a clock timing of a received signal;
   extracting second binary data based on an adjustable second voltage and adjustable clock timing of the received signal;
   acquiring a plurality of the second binary data using a pattern, wherein the pattern includes a plurality of bits indicating presence or absence of the first binary data extracted at a plurality of sampling timings, respectively;
   determining an appearance frequency of the received signal based on the plurality of second binary data and the first binary data; and generating waveform information of the received signal according to the determined appearance frequency.

7. The method of claim 6, wherein generating waveform information of the received signal further comprises:
   statistically processing the second binary data by sampling the received signal a plurality of times using the pattern.

8. The method of claim 7, further comprising:
   repeatedly acquiring the second binary data and performing the statistical processing up to an upper limit determined according to an appearance frequency of each of a plurality of patterns.

9. The method of claim 8, wherein the appearance frequency of each of the plurality of patterns is determined based on the first binary data and a part of the second binary data.

10. The method of claim 6, further comprising:
    generating the waveform information using at least one of hue, saturation, and lightness according to the appearance frequency.

* * * * *